United States Patent [19]

Aoki

[11] Patent Number: 4,465,199

[45] Date of Patent: Aug. 14, 1984

[54] PRESSURE RESISTING PLASTIC BOTTLE

[76] Inventor: Katashi Aoki, 6037 Ohazaminamijo, Sakakimachi, Hanishina-gun, Nagano-ken, Japan

[21] Appl. No.: 389,250

[22] Filed: Jun. 17, 1982

[30] Foreign Application Priority Data

Jun. 22, 1981 [JP] Japan ............................ 56-96226
Sep. 28, 1981 [JP] Japan ...................... 56-143699[U]
May 31, 1982 [JP] Japan ......................... 57-80206[U]

[51] Int. Cl.³ ............................................ B65D 1/02
[52] U.S. Cl. ...................................... 215/1 C; 220/70
[58] Field of Search .................... 215/1 C; 220/70, 66

[56] References Cited

U.S. PATENT DOCUMENTS

| 3,598,270 | 8/1971 | Adomaitis et al. | 215/1 C |
| 3,720,339 | 3/1973 | Khetani | 215/1 C |
| 3,722,726 | 3/1973 | Carmichael et al. | 215/1 C |
| 3,811,588 | 5/1974 | Uermeerbergen et al. | 215/1 C |
| 4,035,455 | 7/1977 | Rosenkranz et al. | |
| 4,036,926 | 7/1977 | Chang | |
| 4,342,398 | 8/1982 | Chang | 215/1 C |
| 4,381,061 | 4/1983 | Cerny et al. | 215/1 C |

FOREIGN PATENT DOCUMENTS

| 55-163137 | 5/1979 | Japan | |
| 56-48946 | 9/1979 | Japan | |
| 2040256 | 8/1980 | United Kingdom | 215/1 C |

Primary Examiner—William Price
Assistant Examiner—Sue A. Weaver
Attorney, Agent, or Firm—Ostrolenk, Faber, Gerb & Soffen

[57] ABSTRACT

This disclosure relates to a pressure resisting plastic bottle having a neck portion, a body portion and a bottom portion integrally formed of polyethylene terephtalate and comprising a bottom wall portion biaxially molecular oriented together with a body wall portion, an inwardly inclined outer peripheral wall portion, an inner peripheral wall portion turned back from the lower end of said outer peripheral wall portion toward the inside and a bottom wall central portion in the form of a convex curved surface formed continuous to the upper portion of the inner peripheral wall portion, whereby an angle $\beta$, included between the vertical and said outer peripheral wall portion is greater than an angle $\alpha$ included between the vertical and said inner peripheral wall portion. Curved inner and outer corners of an annular portion in contact with ground and formed about the lower ends of the respective inner and outer peripheral wall portions, and another curved corner at the juncture between the inner peripheral wall portion and the bottom wall central portion are formed so that the radius of curvature $r_1$ of the outer corner is greater than the radius of curvature $r_2$ of the inner corner, and the radius of curvature $r_3$ of said another corner is greater than said curvature $r_1$.

3 Claims, 8 Drawing Figures

PRESSURE RESISTING PLASTIC BOTTLE

BACKGROUND OF THE INVENTION

Biaxially molecular-oriented polyethylene terephtalate is small in permeability to gases such as oxygen, carbon dioxide or the like and is excellent in heat resisting property, rigidity and transparency, and thus the polyethylene terephtalate is, at present, widely used as a material for plastic bottles for carbonated drinks.

The pressure resisting property and shock resisting property of biaxially oriented plastic bottles (hereinafter referred to as bottles) are obtained when uniform molecular orientation is provided over the whole bottle, and the satisfactory heat resisting strength and shock resisting strength cannot be obtained for bottles in which molecular orientation is not uniform. When a bottle having a conventional bottom structure produced by stretching blow molding techniques presently employed is filled with carbonated drinks and sealed, and when the bottle is left at a temperature of 38° C., the bottom surface of the bottle is deformed by internal pressure and bulges. By increasing the thickness of the bottom wall to prevent such a deformation, the shock strength is reduced whereby if the bottle falls from a high shelf, the bottom breaks. This is because of the fact that in view of the structure of bottles, the biaxial orientation of the bottom tends to be insufficient so that effective molecular orientation may not be obtained.

Therefore, in bottles for carbonated drinks, particularly in bottles for cola, the bottom is formed into a spherical configuration which can be easily biaxially oriented and a base cup formed of other plastic is mounted thereon to provide self-standing properties. Said mounting of the base cup requires adhesives and is accomplished by use of a device entirely different from the bottle molding machine. Therefore, this process increases manufacturing cost as compared with the case of molding bottles having the self-standing properties, and when bottles formed of polyethylene terephtalate are reused, base cups have to be removed every time of operation. In bottles of small capacity, 500 ml, the ratio in which base cup is occupied is greater than that of large bottles in excess of 1000 ml, thus increasing the cost.

In view of the foregoing, self-standing bottles for carbonated drinks which require no base cup have been developed, a part of which is now under operation. Free standing bottles commercially available at present includes those which have petaloid leg portions in which semispherical bottom wall portions are partially projected outwardly (U.S. Pat. No. 3,598,270 Specification) and those which comprise an outer peripheral wall portion in which the bottom wall portion is inwardly inclined and a dome-like bottom wall central portion inwardly curved from the lower end of said outer peripheral wall portion, said outer peripheral wall portion having a plurality of leg portions outwardly projected (British Patent Laid-open No. 2,040,256A Specification).

Any of these aforementioned free standing bottles have leg portions projected, by which leg portions the free standing properties may be secured and the bottom portion is prevented from being deformed due to internal pressure by the rib formed between said leg portions or the rim in the peripheral edge of the dome. In such bottles, it is difficult to mold leg portions, and molding technology of high degree and molding conditions are necessary in order that all of the required number of legs formed therein may be formed in the same form. Further, the free standing properties obtained by the leg portions involve no particular problem in the stationary state of bottles but when bottles are moving for the purpose of being filled, bottles often fall because of slight offsets between the bottles.

Bottles of new structures which overcome these disadvantages noted above with respect to the aforesaid free standing bottles have been proposed (Japanese Patent Application Laid-open No. 163,137/1980). This bottle is provided with the bottom structure similar to that of a champagne bottom, and the free standing properties of the bottle is secured by annular portions in contact with the ground formed over the lower ends of an outer peripheral wall portion in which the bottom wall portion is inwardly inclined and an inner peripheral wall portion in the form of a truncated cone of said outer peripheral wall portion, and the pressure resisting properties thereof is secured by the inner peripheral wall portion and a central portion of the bottom wall having a convex curved surface continuously formed thereabove.

In the bottom structure (hereinafter referred to as the champagne bottom) of said newly proposed bottle, when the bottle, if it is filled with contents, falls, the bottle is broken circularly along the annular portions in contact with the ground. This results from the small radius of curvature of the annular portions in contact with the ground and insufficient biaxial orientation made when molding. Thus, the annular portion in contact with the ground is further projected into a semi-circular shape in section to provide the large radius of curvature, but it involves a difficulty in projecting the annular portion in contact with the ground which corresponds to the juncture between the outer peripheral wall portion and the inner peripheral wall portion into a semi-circular shape in section over the entire circumference similar to that of molding leg portions as already mentioned, and when the radius of curvature increases, the falling shock strength increases but the pressure resisting strength decreases whereby the central portion of the bottom is deformed due to the internal pressure.

The present inventor has molded champagne bottoms of various structures and studied as to the pressure resisting strength and falling shock strength thereof, and as the result, the present inventor has found that to meet the conditions required for bottles for carbonated drinks, that is, conditions such as the pressure resisting strength, falling shock strength, weight reducing, low cost of molding and the like, it is preferably that the angle of inclination formed between the outer peripheral wall portion and the inner peripheral wall portion be formed as acute as possible, the sectional shape of the annular portion in contact with ground is not semi-circular but the curvature between the outer peripheral wall portion side and the inner peripheral wall portion side is made to have a difference, and the wall thickness of the bottom wall portion is made gradually thicker from the outer peripheral wall portion towards the bottom wall central portion, the bottom wall portion being molded at a low temperature of parison and at a low blow pressure.

It has been also found that it is difficult for the prior art stretching blow-molding method, which is a method for axially stretching a parison while all of blow molds are secured and fully distending it in the cavity, to mold a champagne bottom satisfied with the aforesaid conditions. This difficulty results from the fact that a parison of low temperature cannot be stretched, at a low blow pressure, into a narrow space for molding an annular portion in contact with ground formed in the periphery of a bottom mold.

A molding method capable of being satisfied with the above-described conditions comprises imparting a positional change to a bottom mold which forms a part of a blow cavity, stretching and blowing a parison fully to a point where the bottom mold is positioned for molding a bottom portion to precede molding of an outer peripheral wall portion, moving the bottom mold to raise bulged out of the cavity, pushing back the bottom between the lower end of the cavity and the bottom mold to the outer peripheral wall portion, and forming the inner wall portion and bottom wall central portion as if they are turned back into a bottle.

The above-mentioned molding method is disclosed in U.S. Pat. No. 4,035,455 Specification, but it is the most important in this invention that the bottom mold be moved while the bottom of the parison still retains a deformation temperature.

SUMMARY OF THE INVENTION

It is therefore an object of this invention to remove the disadvantages noted above with respect to prior art champagne bottle bottoms.

It is a further object of this invention to provide a plastic bottle which is excellent in both pressure resisting strength and falling shock strength by the provision of specifically structured outer and inner peripheral wall portions and annular portion in contact with ground formed in a bottom of a bottle.

It is another object of this invention to provide a method for extremely easily molding a biaxially oriented polyethylene terephtalate bottle provided with a bottom wall portion comprising an outer peripheral wall portion formed to be inclined inwardly, an inner peripheral wall portion formed to be inwardly turned back from the lower end of said outer peripheral wall portion, and a bottom wall central portion in the form of a convex curved surface continuously formed in the upper portion of said inner peripheral wall portion.

The present invention having the aforementioned objects is characterized in that an angle between the vertical and the outer peripheral wall portion is made greater than an angle between the vertical and the inner peripheral wall portion, curved inner and outer corner portions of the annular portion in contact with ground and formed about the lower ends of the inner and outer wall portions, and another curved corner portion at the juncture between the inner peripheral wall portion and a bottom wall central portion are formed with a difference in curvature between said inner and outer corner portions to increase pressure resisting strength and falling shock resisting strength. The present invention is further characterized by a method wherein a bottom portion of a parison fully axially stretched within a blow cavity is pushed back internally of a previously molded outer peripheral wall portion by moving a bottom mold port upward while the bottom portion of the parison still retains at deformation temperature to mold an inner peripheral wall portion and a central portion of a bottom wall and to mold an annular portion in contact with ground at the same time.

The present invention will be further described hereinafter in detail by way of the embodiment shown in the drawings.

DESCRIPTION OF PREFERRED EMBODIMENT

Figure 1:
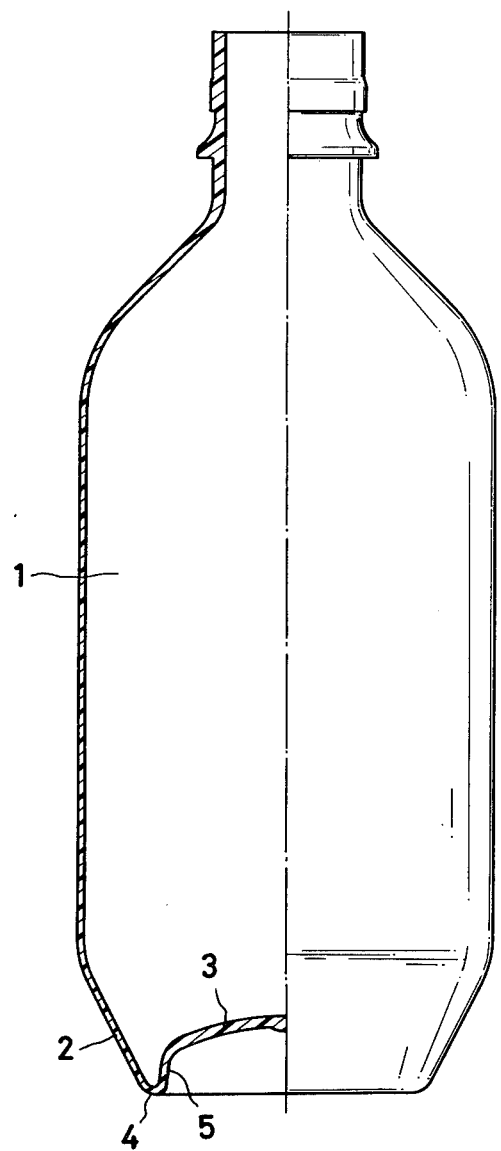
FIG. 1 is an elevation, partially in longitudinal section, of a plastic bottle constructed according to the present invention.

Reference numeral 1 designates a polyethylene terephtalate bottle. This bottle 1 is formed by stretching and blowing an injection molded parison with a bottom within a blow cavity to integrally form a neck, a body wall 1a and a bottom wall 2. The bottom wall 2 of the bottle 1 is biaxially oriented together with the body wall 1a.

The bottom wall 2 is continuous to the body wall 1a and comprises an inwardly inclined outer peripheral wall portion 2a, a bottom wall central portion 3 formed into a convex curved surface and a slightly inwardly inclined inner wall portion 5.

The inner peripheral wall portion 5 is molded while being turned back toward inside from the lower end of the outer peripheral wall portion 2a, and the bottom wall central portion 3 is formed continuously to the upper portion of the inner peripheral wall portion 5.

The annular portion in contact with ground 4 is formed at the lower ends of the outer peripheral wall portion 2a and inner peripheral wall portion 5, the annular portion in contact with ground 4 having inner and outer two corners 4a and 4b. These two corners 4a and 4b are formed into a curved surface together with a corner 5a at the juncture between the bottom wall central portion 3 and the inner peripheral wall portion 5, and the outer corner 4b and the corner 5a at the juncture are formed greater in curvature than that of the inner corner 4a.

In the bottle 1 constructed as described hereinbefore, internal pressure applied to the bottom wall central portion 3 is concentrated on the corner 5a at the juncture since the outer peripheral wall portion 5 supports the circumference of the bottom wall central portion 3. Said internal pressure acts so as to urge the bottom wall central portion 3 in the form of a convex curved surface downwardly, and therefore the circumference of the bottom wall central portion 3, that is, the corner 5a at the juncture, is urged outwardly. On the other hand, since internal pressure is exerted inwardly of the inner peripheral wall portion 5, a stress from the bottom wall central portion 3 which is transmitted to the inner peripheral wall portion is partly offset by internal pressure applied to the inner peripheral wall portion 5 to relieve concentration of stress on the inner peripheral wall portion 5 so that even if deformation occurs in the bottom wall central portion 3, such deformation is not made to influence on the annular portion in contact with ground 4, thus maintaining the free standing.

Figure 3:
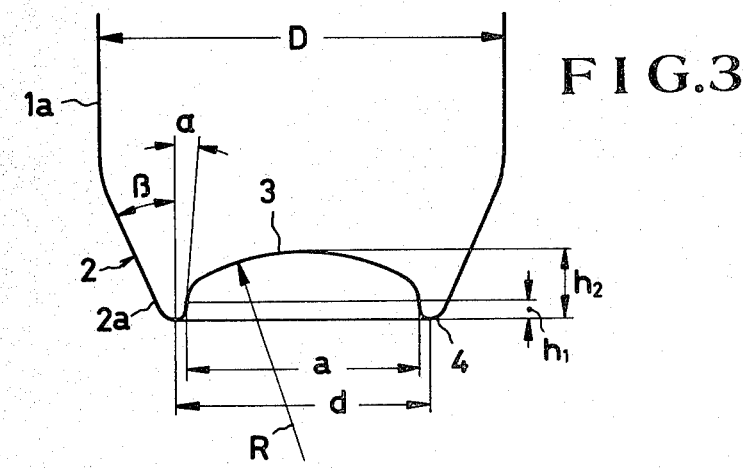
FIG. 3 is a schematic elevation of a bottom showing constitutional requirements of the bottom portion.

The free standing effect will be described with reference to FIG. 3. In the bottle 1 having the ratio d/D between the maximum diameter D of the body portion of the bottle and the diameter d of the annular portion in contact with ground in the range of 0.55 to 0.80, it is preferred that the outer peripheral wall portion 2a is in the range of angle $\beta$ between 6 and 30 degrees with respect to the vertical line whereas it is preferred that the inner peripheral wall portion 5 is in the range of angle $\alpha$ between 5 and 7 degrees with respect to the vertical line. It is also necessary to take the wall-thickness distribution of various parts which constitute the bottom wall portion 2 into consideration in order to increase the pressure resisting strength.

Figure 2:
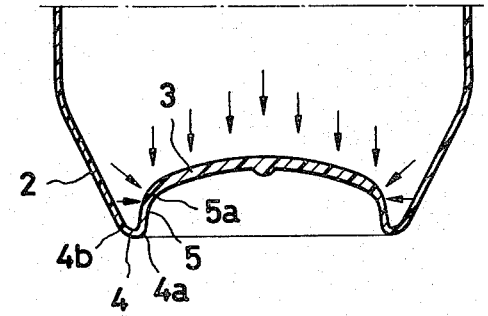
FIG. 2 is an enlarged longitudinal sectional elevation of a bottom portion of the plastic bottle.

While in the embodiment shown in FIG. 2, the bottom wall central portion 3 is formed to have a great wall thickness, if the wall thickness is increased from the inner peripheral wall portion 5, the pressure resisting strength is further increased.

Figure 4:
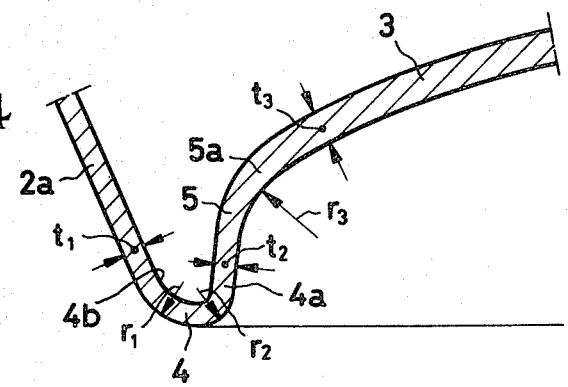
FIG. 4 is an enlarged longitudinal sectional elevation of an annular portion in contact with ground.

In the embodiment shown in FIG. 4, the wall thickness $t_1$ of the outer peripheral wall portion 2a is less than the wall thickness $t_2$ of the inner peripheral wall portion 5, and the wall thickness $t_3$ of the bottom wall central portion 3 is greater than the wall thickness $t_2$ of the inner peripheral wall portion 5. However, these thickness distributions have a quantitative limitation, and when the weight of the bottom wall internally of the annular portion in contact with ground 4 exceeds 16.0% of the weight of bottle, the pressure resisting strength increases but the falling shock strength decreases. This is because of the fact that if the wall thickness increases, the quantity of heat at the bottom of a parison when stretching blow molding takes place is great and thus the bottom is not sufficiently subjected to biaxial orientation as compared with other portions.

When the weight of the bottom wall is less than 14.5%, deformation occurs due to internal pressure. This results from the fact that even if biaxial orientation is sufficient to increase the falling shock strength, the rigidity is lost. Thus, preferably, the weight of the bottom wall is in the range of 14.5% to 16.0% of the weight of the bottle, and preferably, the curvature R of the bottom wall central portion 3 is in the range of 30 to 40 degrees.

Next, Table is given to show factors of bottles which exhibit the excellent effects in the pressure resisting strength and falling shock strength, by a plurality of bottles different in capacity. In the figures, $h_1$ refers to the height of the inner peripheral wall portion; $h_2$, the height to the bottom wall central portion 3, and a, the inside diameter of the inner peripheral wall portion.

| Dimension | Capacity ml | | |
|---|---|---|---|
| | 250 | 500 | 1,000 |
| D mm | 53 | 72 | 80 |
| d mm | 42 | 44.5 | 56 |
| a mm | 38.5 | 41 | 49.5 |
| R mm | 30 | 37–40 | 40 |
| $r_1$ mm | 3 | 3 | 3 |
| $r_2$ mm | 1.25–2 | 1.25–3 | 3–3.5 |
| $r_3$ mm | 5 | 5 | 5 |
| $h_1$ mm | 3.5 | 3.5–4 | 3.5–4 |
| $h_2$ mm | 11 | 12 | 13–13.5 |
| $t_1$ mm | 1.0–1.1 | 1.0–1.1 | 1.0–1.25 |
| $t_2$ mm | 1.1–1.3 | 1.1–1.3 | 1.2–1.4 |
| $t_3$ mm | 1.8 | 1.8–2.0 | 2.0–2.3 |
| $\alpha$ deg. | 5°–7° | 5°–7° | 5°–7° |
| $\beta$ deg. | 6° | 24° | 22° |
| Total wt g | — | 31–32 | 47–48 |
| Bottom wall | — | 4.5–4.6 | 6.8–78.0 |

| Dimension | Capacity ml | | |
|---|---|---|---|
| | 250 | 500 | 1,000 |
| wt g | | | |
| Thermal deformation | no | no | no |
| Falling shock | no | no | no |
| Rupture | no | no | no |

Method for the deformation test 4 vol. of carbonated water is put into a bottle and the bottle is then tightly plugged and put into an oven at 38° C. After 24 hours, the bottle is taken out to see the pressure of deformation in the bottom of the bottle. (Internal pressure of the bottle is about 6.4 kg/cm$^2$.)

Method for the falling shock test

The bottle is allowed to fall vertically from the level of 1.8 m.

Molding of the bottle 1 may be carried out by making use of the molding machine disclosed in U.S. Pat. No. 4,105,391 Specification.

The steps shown in FIG. 5 to FIG. 8 schematically illustrate blow cavities in the aforesaid molding machine for the purpose of explanation.

In the drawings, reference numeral 11 designates a blow mold and 12 is a bottom mold closed for free stroke on the bottom of the blow mold 11. A cavity 13 for molding a bottom portion around the raised bottom mold is narrower than that of prior art, and a lower end surface 13a of the cavity for molding the bottom side of the bottle has a curvature formed to be small.

Reference numeral 14 designates a stretching rod, which is positioned internally of a parison 16 with a bottom transported to the blow mold together with a neck mold 15. Temperature of a parison is 80° to 100° C.

Figure 5:
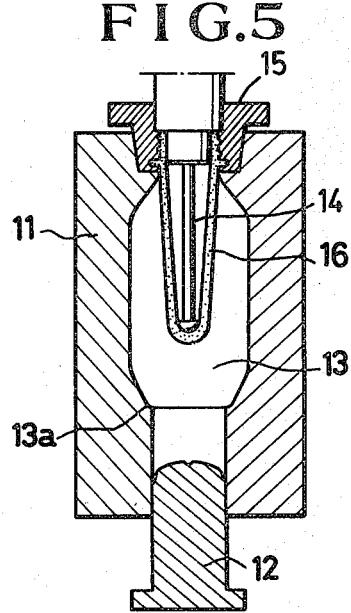
FIG. 5 through FIG. 8 are schematic longitudinal sectional elevations of blow cavities showing successive a method of molding a plastic bottle according to the present invention.
Figure 6:
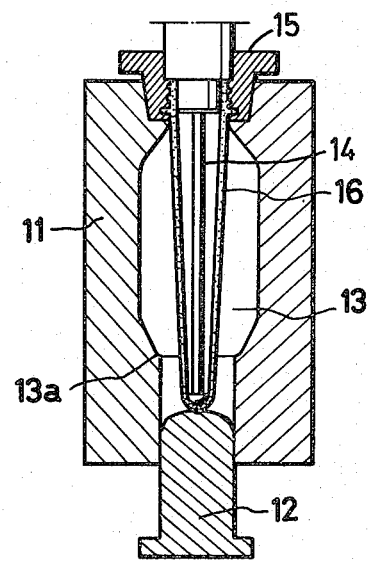
Figure 7:
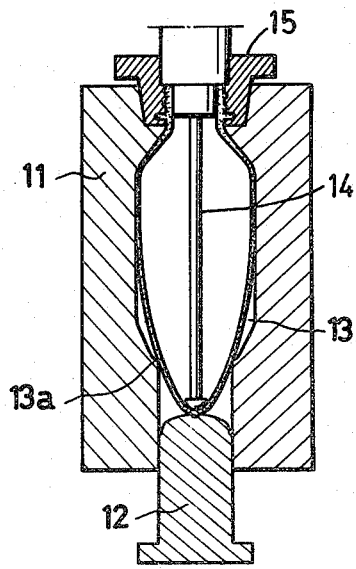
Figure 8:
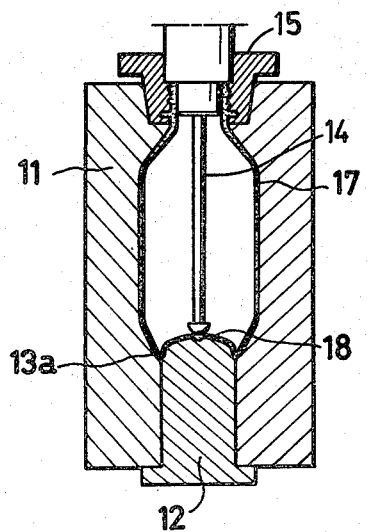

First, the bottom mold 12 is lowered beforehand lower than the molding position, as shown in FIG. 5. Next, the parison 16 is axially stretched to the position of the bottom mold 12, as shown in FIG. 6. Air under pressure of 13–14 kg/cm$^2$ is blown into the parison to distend the parison 16 in a lateral direction as shown in FIG. 7, the bottom mold 12 is moved to the molding position during the process of blow molding to forcibly return the distended parison bottom, and the bottom surface of the bottle 17 is molded into a champagne bottom in the state as shown in FIG. 2 by the upper surface of the bottom mold 12, as shown in FIG. 8.

As described above, in the state wherein the bottom mold 12 is lowered lower than the molding position, the cavity 13 for molding the bottom portion is never formed narrowly, as shown in FIGS. 5 and 9, the material distended by air pressure is sufficiently stretched to the mold surface of the cavity 13 for molding the bottom portion. Under such a condition, when the bottom mold 12 is stroked to the molding position within the time, for example, within 0.2 to 0.5 sec., at which the parison 16 still retains the quantity of heat at a deformation temperature, a portion lower than the lower end surface 13a of the cavity as viewed in FIG. 5 is forced back upward by the upper surface of the bottom mold 12, and a material stretced thin above the lower surface 13a of the cavity in contact with the mold surface is under the process of cooling and solidification and thus only the materials lower than or internally of the lower end surface 13a of the cavity is forced back, where a raised bottom 18 is molded and at the same time, a bottle provided with a predetermined bottom portion as in the cavity 13 for molding the bottom portion, that is, a bottle provided with a bottom structure shown in FIG. 2.

What is claimed is:

1. A pressure resisting plastic bottle having a neck portion, a body portion and a bottom portion integrally formed of polyethylene terephthalate and comprising a bottom wall portion biaxially molecular-oriented together with a body wall portion, an inwardly inclined outer peripheral wall portion at the bottom of said body wall portion, an inner peripheral wall portion turned back from the lower end of said outer peripheral wall portion toward the inside and a bottom wall central portion in the form of a convex curved surface formed continuous to the upper portion of the inner peripheral wall portion, said outer peripheral wall portion being disposed with respect to the vertical at an angle within the range of 6 to 30 degrees, said inner peripheral wall portion being disposed with respect to the vertical at an angle within the range of 5 to 7 degrees, and the diameter d of an annular portion of said bottle in contact with ground and connecting the lower ends of inner and outer peripheral wall portions and the maximum diameter D of the bottle body portion are related by d/D being in the range of 0.55 to 0.80, the improvement wherein said annular portion in contact with ground includes a curved outer corner extending to the outer peripheral wall portion and a curved inner corner extending to the inner peripheral wall portion, a curved additional corner at the juncture between the inner peripheral wall portion and the bottom wall central portion, the outer corner and the additional corner each having a greater radius of curvature than the inner corner, the wall thickness $t_2$ of the inner peripheral wall portion being greater than the wall thickness $t_1$ of the outer peripheral wall portion and the wall thickness $t_3$ of the bottom wall central portion being greater than the wall thickness $t_2$, and the weight of the bottom portion internally of the annular portion in contact with ground being in the range of about 14.5% to 16.0% of the weight of the bottle.

2. A pressure resisting plastic bottle according to claim 1 wherein the radius of curvature of the additional corner is greater than the radius of curvature of the outer corner.

3. A pressure resisting plastic bottle according to claim 1 wherein the convex curved surface extends within a range of 30° to 40°.

* * * * *